United States Patent
Lamm et al.

(10) Patent No.: US 6,346,787 B1
(45) Date of Patent: Feb. 12, 2002

(54) METHOD FOR POSITIONING A PART

(75) Inventors: Hubert Lamm, Kappelrodeck; Guenter Haderer, Buehl, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/530,031
(22) PCT Filed: Apr. 7, 1999
(86) PCT No.: PCT/DE99/01030
    § 371 Date: Jul. 12, 2000
    § 102(e) Date: Jul. 12, 2000
(87) PCT Pub. No.: WO00/11529
    PCT Pub. Date: Mar. 2, 2000

(30) Foreign Application Priority Data

Aug. 24, 1998 (DE) .......................... 198 38 293

(51) Int. Cl.$^7$ .............. H02P 1/00; H02P 1/22; H02P 3/00; H02P 1/40; H02P 3/20
(52) U.S. Cl. ......................... 318/266; 318/466
(58) Field of Search ............... 318/206, 265, 318/266, 466

(56) References Cited

U.S. PATENT DOCUMENTS 5,543,692 A * 8/1996 Howie et al.
5,986,421 A * 11/1999 Fukazawa et al. .......... 318/466
6,086,177 A * 7/2000 Driendl et al.

FOREIGN PATENT DOCUMENTS

DE    195 27 456    1/1997
EP    0 302 461     2/1989

* cited by examiner

*Primary Examiner*—Jeffrey Donels
(74) *Attorney, Agent, or Firm*—Kenyon & Kenyon

(57) ABSTRACT

A method is proposed for positioning a part that is moveable by a drive back and forth between two end positions. For a predefined number of approaches toward one of the end positions, the drive is stopped before reaching this end position and its direction of rotation is changed, and during a subsequent approach toward the end position, the end position is reached, detected and stored for the purpose of normalization, the predefined number being generated in a control unit as random number.

12 Claims, 1 Drawing Sheet

METHOD FOR POSITIONING A PART

BACKGROUND INFORMATION

The invention relates to a method and a device for positioning a part that is movable by a drive back and forth between two end positions.

German Published Patent Application No. 195 27 456 describes drive systems for positioning a part, the part being moveable back and forth between two end positions by a drive, and upon reaching the end positions, a control signal being generated for the drive which stops the drive or reverses its driving direction. When reaching at least one of the end positions for the first time, the position of the drive is detected and stored, and when the part approaches this end position the next time, the drive is stopped before reaching the end position, or its driving direction is reversed. In this manner, the part to be positioned is already stopped in time, so that a mechanical stop is omitted with this limit stop. This reduces the mechanical stress of the entire system, particularly of the drive motor. Furthermore, after a selectable, definitively specified number of approach intervals toward the end position, the part is no longer stopped before reaching the end position, but rather the part to be positioned is driven toward the end position for the purpose of readjusting the entire drive system. In this context, a renormalization is carried out at regular intervals, and thus discernible by the user (driver).

SUMMARY OF THE INVENTION

According to the method of the present invention, a random number generated by a control unit predefines the number of approaches toward one or both of the end positions until a further readjustment of the drive system.

It is particularly advantageous that only random numbers are used which lie within stipulated minimal and maximal limiting values. The limiting values ensure that the system is readjusted or renormalized at useful time intervals. The intervals can preferably be determined by trial by the vehicle manufacturer, so that changes in the system such as friction changes caused by temperature, manifestations of material aging, accumulated inaccuracies in detecting position, and further deviations occurring during the operation of the drive system can be compensated for by renormalization.

Such a method is particularly suitable for drives of sliding sunroofs, tilt/slide sunroofs, power-window units, as well as for seat-adjustment systems or the like in a motor vehicle. In each case, there are one or two end positions which, according to the method of the present invention, are only run into for renormalizing the system.

Preferably one of these end positions is stipulated for renormalizing the system. This end position is run into during the first approach, as well as during each renormalization after the approach cycles predefined by the random number have expired. For example, in the case of a tilt/slide sunroof, the tilt position is suitable as the end position which can be run into, since usually an end position which can be run into does not exist in the slide position.

It is also conceivable to run into both end positions automatically in alternation for the purpose of readjusting the system.

It is further advantageous that the random number is generated by the control unit and is decremented in response to each approach of the part to be positioned to this end position.

DETAILED DESCRIPTION

Figure 1:
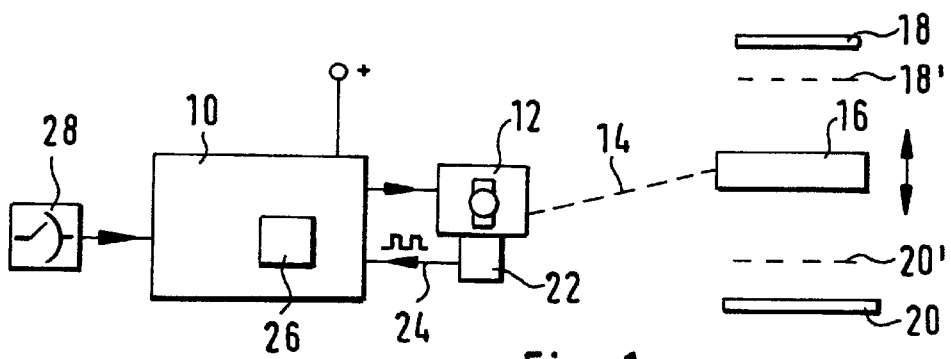
FIG. 1 shows a schematic arrangement for carrying out the method of the present invention.

FIG. 1 shows schematically a drive system for positioning a part. The drive system has a control unit 10, connected to positive potential for the power supply, for a reversible electromotor 12 which is connected via a gearing 14, indicated with a dotted line, to a part 16 to be positioned. Part 16 to be positioned is moved by reversible motor 12 in two directions according to the double arrow up to end stops in end positions 18, 20. Located a short distance before end positions 18, 20 are stop positions 18', 20' at which part 16 is stopped by control unit 10. Stop positions 18', 20' are selected in such a way that, because of its mass inertia, part 16 that is stopped in these stop positions 18', 20' by motor 12 does not reach or only just reaches end positions 18, 20. Therefore, part 16 does not impact on the end stop in end position 18, 20. At the same time, complete opening or closing of part 16 is ensured.

Arranged at motor 12, preferably at its output shaft, is a position sensor 22 whose pulse-shaped position signals 24 in response to the rotating shaft are supplied to control unit 10 for evaluating the position, moving direction and/or the velocity of part 16. A position counter 26 in control unit 10 counts position signals 24 depending on the moving direction of part 16 up or down. Thus, a specific position of part 16 is allocated to each value of the counter.

In addition, an operating control element 28 to be operated by the user is connected to a further input of control unit 10. The user selects the desired position or the desired adjustment movement of part 16 via operating control element 28.

In the following, it is assumed that this drive system is a tilt/slide sunroof drive. In this context, sliding-sunroof cover 16 as the part to be positioned is moved, controlled by control unit 10 and driven by motor 12, back and forth between the fixed stop of end position 18 in its open tilt position and end position 20 in its open slide position. Tilt/slide sunroof drives usually have no fixed stop 20 in the open slide position, so that sliding-sunroof cover 16 cannot be driven up to end position 20. Therefore, only the fixed stop of the tilt position is suitable as end position 18 to be run into.

Stop position 18' in advance of the tilt position as end position 18 is only a few angular degrees distant from the fixed stop. This corresponds to an adjusting path of the topmost edge of the open tilt/slide sunroof cover of approximately 0.5 to 1 cm. It is scarcely apparent to the user whether tilt/slide sunroof cover 16 is now stopped and/or reversed in stop position 18' or at the fixed stop of end position 18 of the tilt position.

A Hall-effect sensor system is used as position sensor 22. Ring magnets of different polarity surround the output shaft of motor 12 and co-act with a Hall detector. Due to the rotation of the output shaft of motor 12, polarity reversals exist at the Hall detector which lead to pulse-shaped position signals 24, and thus represent the adjustment movement of sliding-sunroof cover 16.

Figure 2:
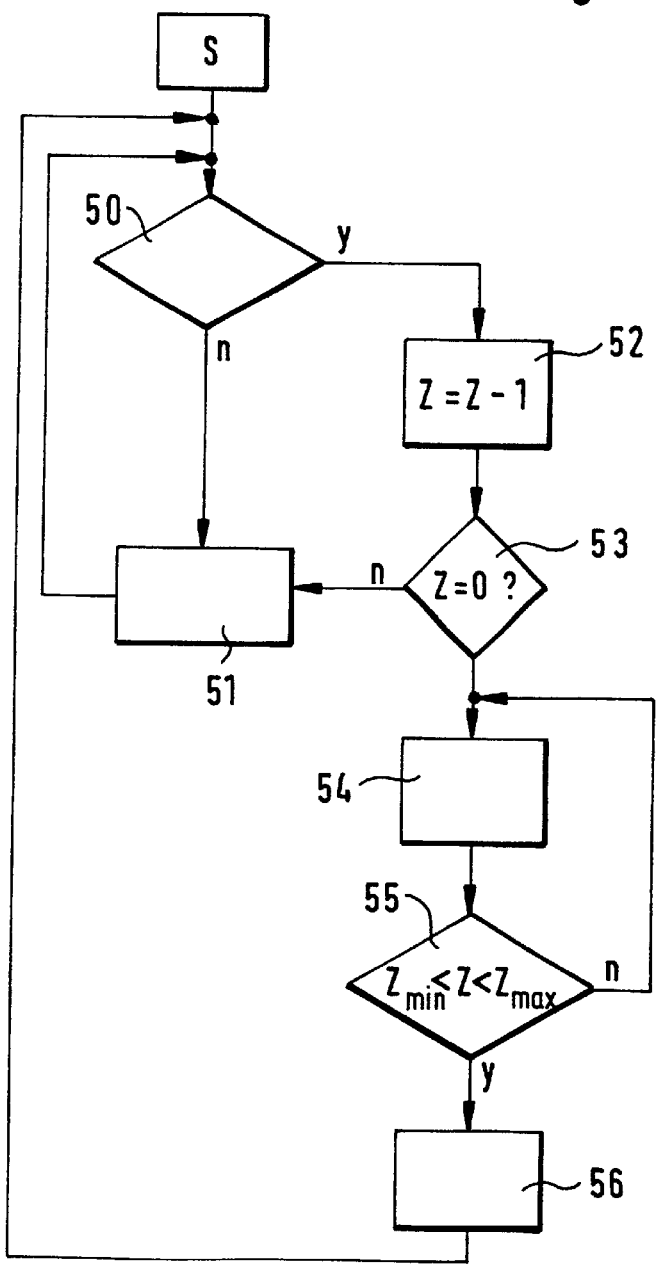
FIG. 2 shows a flow chart for describing the method according to the present invention.

The method of the present invention stored in control unit 10 is explained in the following with reference to FIG. 2. At the first start S, a so-called compulsory normalization of the drive system is carried out, since during a breaking operation (power down) preceding the start-up of the power supply of control unit 10 (power on), counter 26 is switched off, and thus the prevailing position of sliding-sunroof cover 16 is no longer stored in control unit 10. Consequently, the start is carried out in response to an interruption of the power supply, e.g., by disconnecting the vehicle battery.

Therefore, at start S, the normalization leads to the sliding-sunroof cover opening into fixed stop 18 of the tilt position, counter 26 than being set to zero. In subsequent step 50, the status of the tilt position of operating control element 28 is read out. If the adjustment command "not in the tilt position of the sliding sunroof" is selected (50), then in 51, the normal adjustment operation is carried out according to the setting by operating control element 28. If the adjustment command "tilt position of the tilt/slide sunroof" was selected by the user, this is detected by control unit 10 and is judged as an approach of cover 16 toward end position 18. According to the arrow marked by "y", one arrives at the following step 52, in which a random number Z, generated in advance by control unit 10, is decremented by one by control unit 10.

In step 53, the value of the previously decremented random number Z is subsequently checked by control unit 10. If random number Z has a value not equal to zero (n), the normal adjustment operation is carried out according to the setting by the user with the aid of operating control element 28 (51), according to which the adjustment movement of cover 16 is stopped in stop position 18', so that the cover does not reach end position 18. The method subsequently starts from the beginning.

Otherwise, if random number Z assumes the value zero, in step 54, control unit 10 generates a new random number Z. In step 55, this new random number is checked with limiting values Zmin and Zmax stored in control unit 10. For example, limiting value Zmin lies at a number of approaches of 40 to 50, limiting value Zmax lies at 200 approach cycles. Limiting values Zmin and Zmax are determined experimentally and established by the vehicle manufacturer. If random number Z generated in step 54 does not lie within the predefined limiting values (n), a new random number Z is in turn generated. Otherwise (y), in 56, an adjustment operation of sliding-sunroof cover 16 into tilt position 18 is carried out together with automatic renormalization. During the renormalization, position counter 26 is reset to a predefined value, preferably zero.

During the normalization and renormalization, end position 18 is recognized when sliding-sunroof cover 16 has reached mechanical fixed stop 18, and thus, because of a blocked motor 12, position sensor 22 no longer generates position signals 24. Control unit 10 detects that motor 12 continues to be controlled and the position signals fail to appear for a specific, predefined time, and thereupon resets counter 26.

During the shift of cover 16 from its tilt position 18 in the direction of the closed position or of the slide position, position sensor 22 generates pulses 24 which, for example, increment counter 26 and, given a reverse direction of movement, decrement the counter. In this manner, each position of sliding sunroof cover 16 is assigned a count value in counter 26. Stop position 20' is likewise established as a function of a counter value.

During a normalization, end stop 18 is defined by the sliding-sunroof drive, end stop 20 being stored, for example, as a numerical value of counter 26 in the control unit.

For example, in the case of a drive for a power-window unit, limit stops 18 and/or 20 are determined in particular in alternating manner, counter 26 being reset to a fixed value for the one end stop, and the counter value being stored in the case of the other end stop. Thus, the end stops are defined on the basis of the value of counter 26, and therefore in relation to the number of revolutions of electromotor 12. The distance of stop positions 18', 20' before end positions 18, 20 can be chosen as desired, such as two revolutions of the output shaft of motor 12, or else can be calculated during the adjustment operation of part 16 to be positioned from parameters of, for example, the adjustment speed and/or the motor voltage or the motor current.

All in all, therefore, a drive system is provided which permits gentle back and forth movement of part 16 between its end stops. This reduces wear and tear of the drive system and increases the total service life. In particular, it is possible to achieve a variable cycle quantity, predefined by a random number, with which part 16 can be moved toward its end stops 18 and 20, respectively.

What is claimed is:

1. A method for positioning a part that is moveable by a drive back and forth between two end positions, comprising the steps of:
   generating in a control unit a predefined number as a random number;
   for a quantity of approaches toward one of the end positions and corresponding to the predefined number, stopping the drive before reaching the one of the end positions; and
   during a subsequent approach toward the one of the end positions, performing the steps of:
   reaching the one of the end positions,
   detecting the one of the end positions, and
   storing the one of the end positions, wherein the reaching step, the detecting step, and the storing step are performed for the purpose of a normalization.

2. The method according to claim 1, wherein:
   the step of generating includes the step of selecting the random number as one lying within predefined limiting values.

3. The method according to claim 1, further comprising the step of:
   when approaching the one of the end positions for a first time, driving the part into the one of the end positions and performing the normalization in the one of the end positions.

4. The method according to claim 1, further comprising the step of:
   decrementing the random number in response to each approach of the part toward a stop position associated with the one of the end positions.

5. The method according to claim 4, further comprising the step of:
   upon the random number reaching zero, running the part into the one of the end positions and performing the normalization in the one of the end positions.

6. The method according to claim 1, further comprising the step of:
   during the normalization, setting a position counter for detecting a position of the part to a predefined value.

7. The method according to claim 6, wherein:
   the predefined value corresponds to zero.

8. The method according to claim 1, wherein:
   the part is one of a sliding sunroof, a tilt/slide sunroof, a power-window system, and a seat-adjustment system, used in a motor vehicle.

9. The method according to claim 8, wherein:
   the end position is an opened tilt position of the tilt/slide sunroof.

10. The method according to claim 2, wherein the normalization device controls the drive such that a direction of rotation of the drive is changed.

11. A device for positioning a part that is moveable by a drive back and forth between two end positions, comprising:
- a control unit for generating a predefined number as a random number;
- a drive stopper for stopping the drive before reaching the one of the end positions for a quantity of approaches toward one of the end positions and corresponding to the predefined number; and
- a normalization device for controlling the drive such that the part is moved into the one of the end positions, detecting the one of the end positions, and storing the one of the end positions during a subsequent approach toward the one of the end positions, wherein the reaching, the detecting, and the storing are performed for the purpose of a normalization.

12. The method according to claim 1, further comprising the step of:
- changing a direction of rotation of the drive.

* * * * *